US012630160B2

(12) United States Patent (10) Patent No.: US 12,630,160 B2
Ruppin et al. (45) Date of Patent: May 19, 2026

(54) METHOD FOR BEHAVIOR PLANNING OF A VEHICLE

(71) Applicant: Robert Bosch GmbH, Stuttgart (DE)

(72) Inventors: Stefan Ruppin, Grafenau (DE); Ralf Kohlhaas, Calw (DE); Thomas Schamm, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 203 days.

(21) Appl. No.: 18/529,233

(22) Filed: Dec. 5, 2023

(65) Prior Publication Data

US 2024/0208504 A1 Jun. 27, 2024

(30) Foreign Application Priority Data

Dec. 21, 2022 (DE) ..................... 10 2022 214 147.4

(51) Int. Cl.
| | |
|---|---|
| *B60W 30/18* | (2012.01) |
| *B60W 40/04* | (2006.01) |
| *G08G 1/01* | (2006.01) |

(52) U.S. Cl.
CPC ...... *B60W 30/18009* (2013.01); *B60W 40/04* (2013.01); *G08G 1/0112* (2013.01); *G08G 1/0125* (2013.01); *B60W 2552/20* (2020.02); *B60W 2555/60* (2020.02)

(58) Field of Classification Search
CPC .......... B60W 30/18009; B60W 40/04; B60W 2552/20; B60W 2555/60; B60W 30/18154; B60W 30/18159; B60W 60/001; B60W 30/095; G08G 1/0125; G08G 1/166
See application file for complete search history.

(56) References Cited

U.S. PATENT DOCUMENTS

| | | | |
|---|---|---|---|
| 10,369,990 B2 * | 8/2019 | Gussner | .............. B60W 30/095 |
| 2010/0098295 A1 * | 4/2010 | Zhang | .................... G08G 1/167 |
| | | | 348/148 |
| 2018/0158334 A1 * | 6/2018 | Perez Barrera | ........ G08G 1/166 |
| 2020/0310451 A1 * | 10/2020 | Zhu | ........................ G05D 1/0223 |
| 2022/0135075 A1 * | 5/2022 | Ng | .......................... G06V 20/56 |
| | | | 701/301 |
| 2022/0306112 A1 * | 9/2022 | Yan | ........................ B60W 30/16 |

FOREIGN PATENT DOCUMENTS

| | | |
|---|---|---|
| DE | 102012009555 A1 | 11/2012 |
| DE | 102017115810 A1 | 1/2019 |
| DE | 102019131630 A1 | 5/2021 |
| DE | 102021110281 A1 | 10/2022 |

* cited by examiner

*Primary Examiner* — Stephanie T Su
(74) *Attorney, Agent, or Firm* — NORTON ROSE FULBRIGHT US LLP

(57) ABSTRACT

A method for behavior planning of a vehicle. The method includes: receiving data of an environment detection system and of a planned route of the vehicle; ascertaining a traffic scenario based on the data of the environment detection system and of the planned route; ascertaining at least one geometric behavior option based on the traffic scenario; ascertaining a behavior that can be performed by the vehicle, taking into account the at least one behavior option.

13 Claims, 3 Drawing Sheets

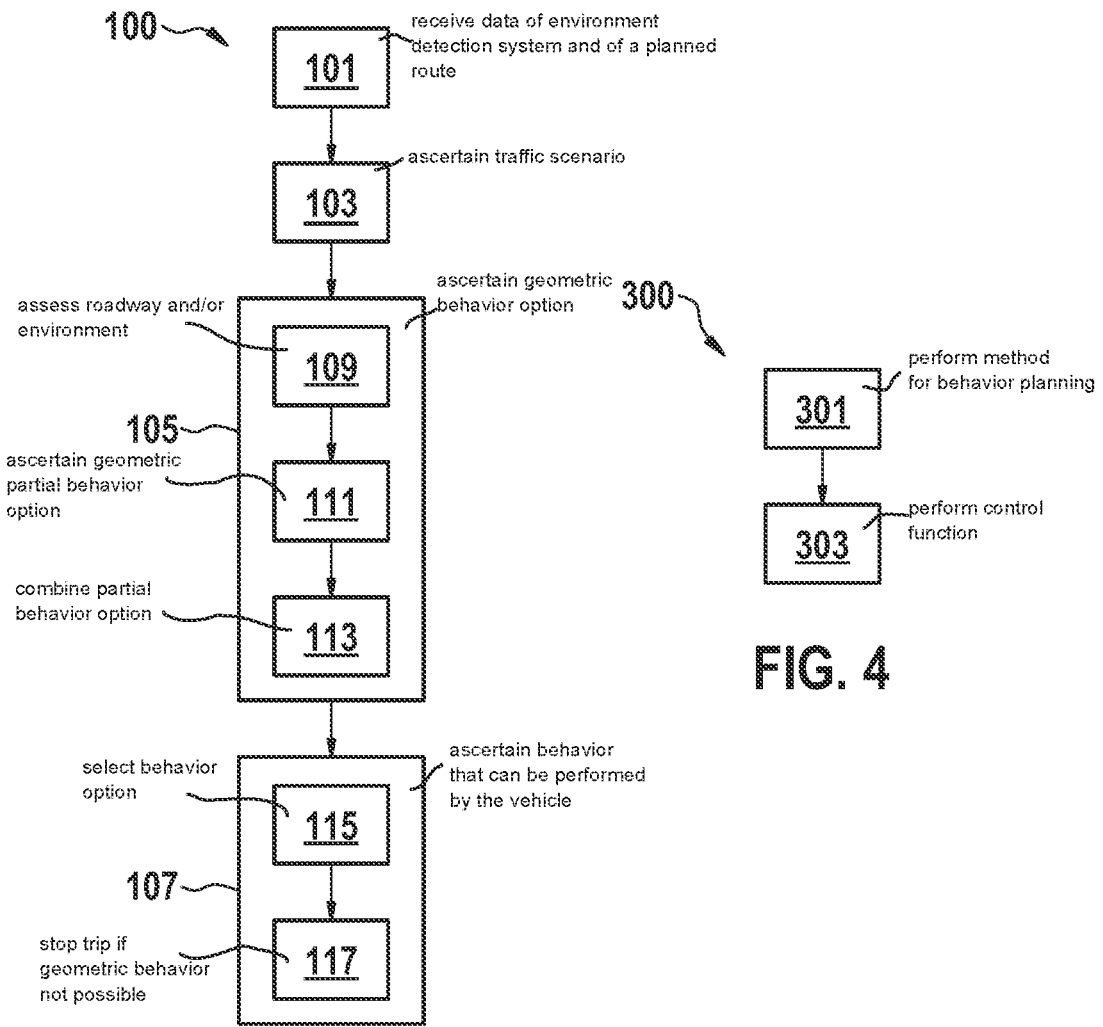

100 receive data of environment detection system and of a planned route

101 ascertain traffic scenario

103 ascertain geometric behavior option

300 assess roadway and/or environment

109

105 ascertain geometric partial behavior option

111 combine partial behavior option

113 select behavior option ascertain behavior that can be performed by the vehicle

115

107 stop trip if geometric behavior not possible

117 perform method for behavior planning

301 perform control function

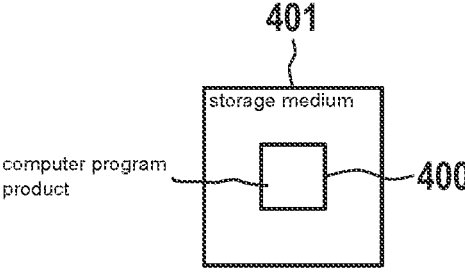

401 storage medium computer program product

METHOD FOR BEHAVIOR PLANNING OF A VEHICLE

CROSS REFERENCE

The present application claims the benefit under 35 U.S.C. § 119 of German Patent Application No. DE 10 2022 214 147.4 filed on Dec. 21, 2022, which is expressly incorporated herein by reference in its entirety.

FIELD

The present invention relates to a method for behavior planning for a vehicle.

BACKGROUND INFORMATION

Certain methods for behavior planning of vehicles are described in the related art.

DETAILED DESCRIPTION OF EXAMPLE EMBODIMENTS

It is an object of the present invention to provide an improved method for behavior planning for a vehicle and an improved method for controlling a vehicle.

This object may be achieved by a method for behavior planning for a vehicle and the method for controlling a vehicle according to the present invention. Advantageous embodiments of the present invention are disclosed herein.

According to one aspect of the present invention, a method for behavior planning for a vehicle is provided. According to an example embodiment of the present invention, the method comprises:

receiving data of environment detection system and of a planned route of the vehicle;

ascertaining a traffic scenario based on the data of the environment detection system and of the planned route, wherein the traffic scenario describes at least one course of a roadway driven by the vehicle, and the correspondingly planned route;

ascertaining at least one geometric behavior option based on the traffic scenario, wherein the at least one geometric behavior option defines at least one surface that can be driven by the vehicle, and/or one surface that cannot be driven by the vehicle, and/or one surface that is to be driven by the vehicle, wherein the drivable surface describes a surface of the environment that is provided for use by vehicles according to the prevailing traffic rules and/or that can be driven by the vehicle without collision in the given traffic scenario, wherein a non-drivable surface defines a surface of the environment that is not provided for use by vehicles according to the prevailing traffic rules and/or that cannot be driven by the vehicle without collision in the given traffic scenario, and wherein a surface to be driven defines a surface of the environment that is to be driven by the vehicle in order to fulfill the planned route;

ascertaining a behavior that can be performed by the vehicle, taking into account the at least one geometric behavior option, wherein the behavior that can be performed provides for driving the vehicle exclusively within the defined drivable surfaces of the geometric behavior option.

This can achieve a technical advantage that an improved method for behavior planning for a vehicle can be provided. For this purpose, a geometric behavior option is ascertained based on a traffic scenario. The geometric behavior option describes geometric areas within the environment of the vehicle in the form of drivable surfaces, non-drivable surfaces, or surfaces to be driven, which, according to the prevailing traffic regulation or according to the prevailing traffic volume, can be driven by the vehicle without collision, are not provided for driving and cannot be driven without collision, or are to be driven by the vehicle in order to fulfill the planned route. Based on the geometric behavior option, a behavior to be performed accordingly by the vehicle is subsequently planned, wherein the planned behavior provides that the vehicle is controlled exclusively in areas of the drivable surfaces and/or of the surfaces to be driven of the geometric behavior option. Through the corresponding surfaces of the geometric behavior option, precise and simplified behavior planning for a vehicle is made possible. By correspondingly calculating the behavior option based on the drivable surfaces, non-drivable surfaces and surfaces to be driven, it is possible to determine a desired behavior of the vehicle not based on a specification of semantic control instructions but based on a geometric restriction of the action space of the vehicle, taking into account the drivable surfaces, non-drivable surfaces, and surfaces to be driven of the behavior option.

Within the meaning of the application, a vehicle can in particular be an autonomously driving vehicle.

According to an example embodiment of the present invention, the traffic scenario describes at least the traffic infrastructure in the environment of the vehicle and the static or dynamic objects positioned in the environment of the vehicle. The dynamic or static objects taken into account can be infrastructure objects or even further road users, such as further vehicles, motorcyclists, cyclists, or pedestrians, or animals.

In addition, according to an example embodiment of the present invention, the traffic scenario can comprise traffic regulations in the form of traffic signs or traffic lights. In addition, the traffic scenario can take into account the conditions of the driven roadway as well as weather conditions, such as visibility or adhesion of the road surface. According to an example embodiment of the present invention, the traffic scenario can take into account a multitude of different aspects of the environment of the vehicle that must be taken into account in the behavior or trajectory planning of the vehicle.

According to one example embodiment of the present invention, ascertaining the geometric behavior option comprises:

assessing a roadway driven by the vehicle, and/or an environment of the roadway with respect to a plurality of scene aspects;

ascertaining, for each scene aspect, at least one geometric partial behavior option, wherein the geometric partial behavior option defines at least one partial surface that can be driven by the vehicle, and/or one partial surface that cannot be driven by the vehicle, and/or one partial surface to be driven by the vehicle, wherein the drivable partial surface describes a surface of the roadway that is provided for use by vehicles according to the prevailing traffic rules and/or with respect to the respective scene aspect, and/or that can be driven by the vehicle without collision in the given traffic scenario, wherein a non-drivable partial surface defines a surface of the roadway that is not provided for use by vehicles according to the prevailing traffic rules and/or with respect to the respective scene aspect, and/or that cannot be driven by the vehicle without collision in the given traffic scenario, and wherein a surface to be driven defines a surface of the roadway that is to be driven by the vehicle in order to fulfill the planned route with respect to the respective scene aspect; and combining the plurality of geometric partial behavior options and generating the geometric behavior option as a combination of the geometric partial behavior options.

This can achieve a technical advantage that, by dividing the roadway to be driven by the vehicle, into a plurality of scene aspects, a determination of the surfaces of the geometric behavior option to be carried out as precisely and easily as possible can be achieved. For this purpose, geometric partial behavior options, which respectively comprise corresponding drivable partial surfaces, non-drivable partial surfaces, or partial surfaces to be driven, are ascertained for each scene aspect individually. The individually calculated, geometric partial behavior options are subsequently combined to form the geometric behavior option. By individually considering the individual scene aspects, simplified calculation of the geometric behavior options is made possible. In addition, by individually considering the individual scene aspects, a more precise consideration of individual aspects of the scene aspects can be achieved. As a result, a more precise determination of the individual surfaces of the geometric behavior option can be achieved. By combining the plurality of geometric partial behavior options, the individually ascertained partial surfaces can be precisely integrated into the geometric behavior option.

According to one example embodiment of the present invention, when combining the geometric partial behavior options, each non-drivable partial surface of the geometric partial behavior options is adopted into the geometric behavior option.

This can achieve a technical advantage that a safe behavior of the vehicle can be planned based on the geometric behavior option. For this purpose, the non-drivable partial surfaces of the individual geometric partial behavior options are adopted unchanged into the geometric behavior option. A non-drivable partial surface of each scene aspect is thus adopted unchanged as a non-drivable partial surface into the geometric behavior option. Since the behavior planned based on the geometric behavior option provides that driving on the non-drivable surfaces is excluded, a safe behavior of the vehicle can thus be ensured.

According to one example embodiment of the present invention, in the case of a spatial overlap of at least two of the geometric partial behavior options, a non-drivable partial surface of at least one of the overlapping geometric partial behavior options is taken into account in a prioritized manner in comparison to a drivable partial surface or a partial surface to be driven of the respectively other geometric partial behavior option.

This can achieve a technical advantage that, by taking into account the non-drivable partial surfaces of the individual geometric partial behavior options in a prioritized manner, the safety of the vehicle in the behavior planning can be ensured.

According to one example embodiment of the present invention, a size and/or a position of a drivable surface/partial surface and/or of a non-drivable surface/partial surface and/or a surface/partial surface to be driven is determined as a function of properties of the roadway driven, and/or taking into account a prevailing traffic regulation, and/or taking into account a traffic volume.

This can achieve an technical advantage that the surfaces or partial surfaces of the geometric behavior option or of the geometric partial behavior options can be precisely adjusted to the present traffic scenario, in particular to roadway properties, traffic regulations, or further road users. This makes safe behavior of the vehicle possible.

According to one example embodiment of the present invention, the roadway is divided into scene aspects based on different roadway portions, wherein the roadway portions comprise: straight section, curved section, intersection area, intersection entrance, intersection exit, traffic-lighted intersection, non-traffic-lighted intersection, right turn, left turn, highway entrance ramp, highway exit, highway, country road, one-lane road, multi-lane road with or without oncoming traffic, inner-city road, traffic-calmed zone, 30 km/h area, tunnel entrance, tunnel exit, tunnel area, road with upward slope, road with downward slope, entrance into roundabout, roundabout, exit from roundabout, railroad crossing, parking lot entrance, parking lot exit, parking lot, parking garage entrance, parking garage exit, parking garage.

This can achieve a technical advantage that, as a function of the properties of the roadway driven, various scene aspects can be taken into account individually and as a function of their properties. This makes it possible to precisely design the surfaces or partial surfaces of the geometric behavior options or of the geometric partial behavior options. This in turn makes precise and safe behavior planning possible.

According to one example embodiment of the present invention, the roadway is divided into scene aspects based on different driving maneuvers of the vehicle, wherein the driving maneuvers of the vehicle comprise: driving along a straight section, cornering, turning process, lane change, driving on a highway, driving on a country road, inner-city driving, accelerated driving, stopping at a stop line, driving onto a highway, exiting a highway, entering a tunnel, exiting a tunnel, entering an intersection, crossing an intersection, exiting an intersection, entering a roundabout, driving in a roundabout, exiting a roundabout, stopping at a railroad crossing, crossing a railroad crossing, driving around an obstacle, driving in a construction area, entering a parking garage, exiting a parking garage, driving in a parking garage.

This can achieve a technical advantage that different driving maneuvers of the vehicle can be taken into account through the various scene aspects. The geometric partial behavior options respectively individually adjusted to the various scene aspects can thus likewise be adjusted to the various different driving maneuvers of the vehicle. By taking into account the driving maneuvers, in addition to the properties of the roadway, the various surfaces or partial surfaces of the geometric behavior options or of the geometric partial behavior options are adjusted to the various driving maneuvers. This allows a more detailed specification of the design of the different surfaces or partial surfaces and an associated more detailed specification of the behavior planning.

According to one example embodiment of the present invention, the geometric behavior option and/or the geometric partial behavior options are designed as hypersurfaces and comprise control instructions in addition to the drivable surfaces/partial surfaces and/or non-drivable surfaces/partial surfaces and/or surfaces/partial surfaces to be driven, wherein the control instructions comprise: maintaining a maximum allowable speed, orientation, minimum speed, and/or maintaining a maximum allowable time period for driving a predefined scene aspect of the roadway, and/or performing a predefined steering angle, and/or performing a predefined braking power, and/or activating a light signal and/or an audio signal and/or a vehicle-to-vehicle signal, and/or positioning the vehicle in a position with maximum view of a portion of the roadway positioned in front of the vehicle.

This can achieve the technical advantage that, in addition to the geometric information in the form of surfaces or partial surfaces, further semantic information on the behavior planning can be taken into account in the geometric behavior options or in the geometric partial behavior options. The semantic information can be taken into account in the form of control instructions to the vehicle. This makes possible a more detailed specification of the behavior planning based on the geometric behavior options. In so doing, each of the mentioned limitations can be a function of other parameters, e.g., the maximum speed can also be a function of the time.

According to one example embodiment of the present invention, ascertaining the driving behavior comprises:

stopping a trip of the vehicle if a trip of the vehicle along exclusively drivable surfaces is not possible.

This can achieve the technical advantage that a safe behavior of the vehicle can be planned. If ascertaining the drivable surfaces, non-drivable surfaces and/or surfaces to be driven of the geometric behavior option results in that, along the planned route, the vehicle cannot exclusively drive along the drivable surfaces and/or surfaces to be drivable, but must, where necessary, drive through non-drivable surfaces, the trip of the vehicle is automatically stopped. Since driving on non-drivable surfaces is not permitted, the safety of the vehicle can continue to be ensured by stopping the trip of the vehicle. The trip of the vehicle is preferably always ended with a planned standstill within a drivable surface. In an advantageous embodiment, this happens with as much progress as possible along the route.

According to one example embodiment of the present invention, a plurality of geometric behavior options is provided in the method step, wherein ascertaining the driving behavior comprises:

selecting one of the plurality of geometric behavior options according to a selection criterion.

This can achieve the technical advantage that, by selecting one of the plurality of geometric behavior options according to the selection criterion, an optimized behavior of the vehicle can be planned.

According to one example embodiment of the present invention, the selection criterion comprises: availability of a trip of the vehicle along exclusively drivable surfaces, and/or a time period needed to drive on the roadway according to the geometric behavior option, and/or a safety of the vehicle expected while driving on the roadway according to the geometric behavior option, and/or a number and/or an intensity of steering movements and/or acceleration processes needed to drive on the roadway according to the geometric behavior option, and/or a matching of a driving behavior of the vehicle corresponding to the geometric behavior option with a driving behavior of the vehicle currently being performed.

This can achieve the technical advantage that the optimal geometric behavior option can be selected from the plurality of available behavior options.

According to one example embodiment of the present invention, selecting comprises ascertaining a path or driving trajectory that exclusively runs within the drivable surfaces and follows the control instructions.

This can achieve the technical advantage that the geometric behavior option that has a path drivable by the vehicle through exclusively drivable surfaces can be selected from the plurality of available behavior options. Non-drivable surfaces are, on the other hand, not driven by the vehicle. As a result, a safe behavior of the vehicle can thus be planned.

According to one example embodiment of the present invention, the path is ascertained by performing an A* algorithm on a plurality of possible poses and/or states of the vehicle within the drivable surfaces.

This can achieve the technical advantage that, by using the A* algorithm, a technically simple and precise solution can be provided for ascertaining the vehicle exclusively running along the drivable surface. The states of the vehicle can in this case be given by poses and time points of the vehicle. A pose of the vehicle is given by a position and an orientation of the vehicle. A path is given by a drivable sequence of poses. A driving trajectory is given by a drivable sequence of states.

According to one aspect of the present invention, a method for controlling a vehicle is provided, comprising:

performing the method for behavior planning of a vehicle according to one of the above-described embodiments; and performing at least one control function of the vehicle according to the planned behavior.

This can achieve the technical advantage that an improved method for controlling a vehicle is provided, which takes into account a behavior planning with the technical advantages described above.

According to one aspect of the present invention, a computing unit is provided, which is configured to perform the method for behavior planning for a vehicle according to one of the above-described embodiments and/or the method for controlling a vehicle.

According to one aspect of the present invention, a computer program product is provided, comprising instructions that, when the program is executed by a data processing unit, cause the data processing unit to perform the method for behavior planning for a vehicle according to one of the above-described embodiments and/or the method for controlling a vehicle.

Exemplary embodiments of the present invention are explained with reference to the figures below.

BRIEF DESCRIPTION OF THE DRAWINGS

FIG. 3 shows a flow chart of a method for behavior planning for a vehicle, according to one example embodiment of the present invention.

FIG. 4 shows a flow chart of a method for controlling a vehicle, according to one example embodiment of the present invention.

FIG. 5 shows a schematic representation of a computer program product according to one example embodiment of the present invention.

DETAILED DESCRIPTION OF EXAMPLE EMBODIMENTS

Figure 1:
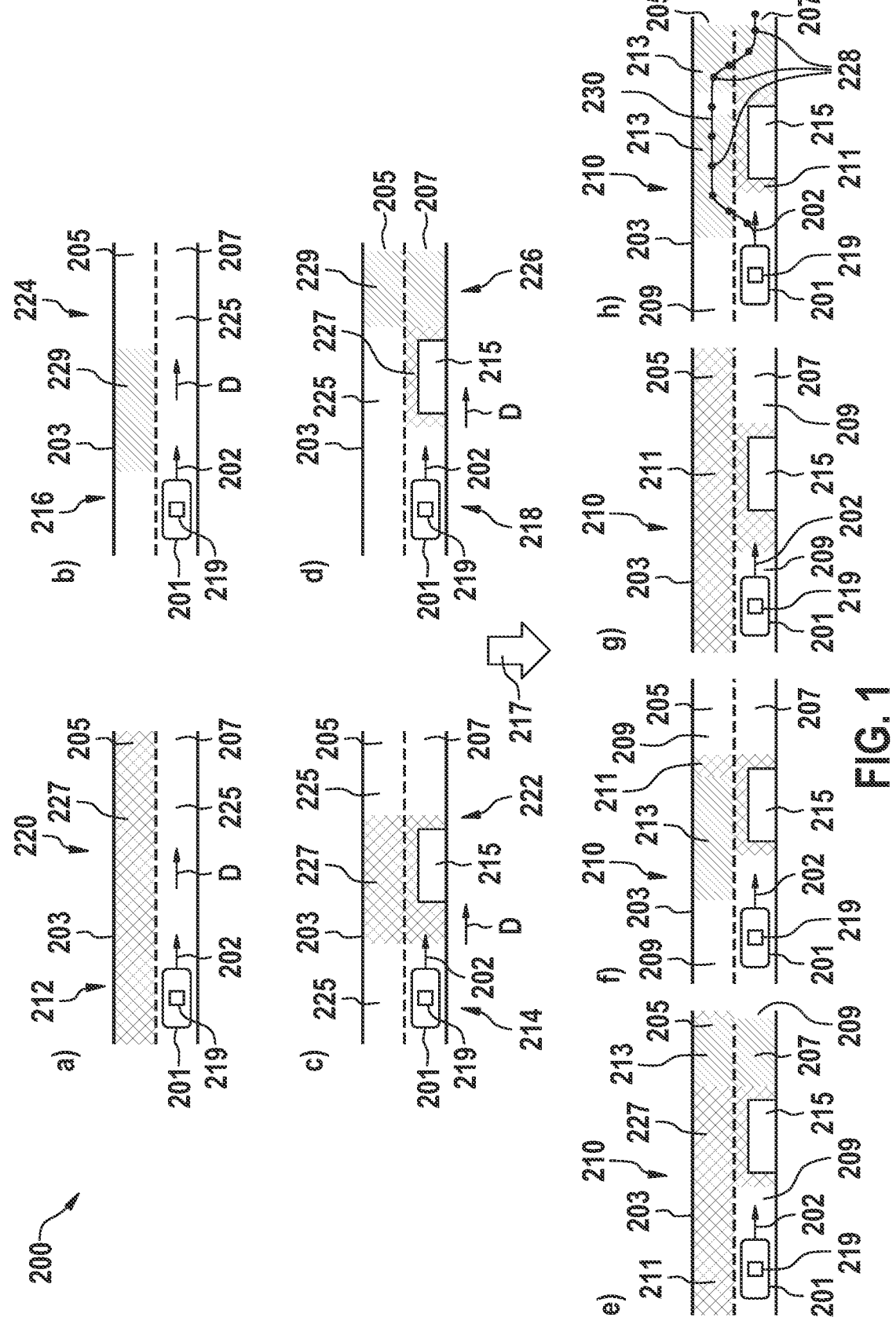
FIG. 1 shows a schematic representation of a system for behavior planning for a vehicle, according to one example embodiment of the present invention.

FIG. 1 shows a schematic representation of a system 200 for behavior planning for a vehicle 201, according to one embodiment.

FIG. 1 shows a driving situation of a vehicle 201 in which the vehicle 201 drives along a roadway 203. The roadway 203 comprises two lanes 205, 207. An object 215 is furthermore positioned in the driving direction in the lane 207 driven by the vehicle 201. The object 215 can, for example, be a parking vehicle or another object at least partially blocking the lane 207. In the example shown, the lane 207 is used for vehicles 201 along the driving direction D while the lane 205 is used for oncoming traffic. In order to perform the method for behavior planning according to the present invention, the vehicle 201 furthermore comprises a computing unit 219.

With reference to graphs a) to h), various steps of the method for behavior planning according to the present invention for a vehicle 201 are now described.

Graphs a) to d) describe four different geometric partial behavior options 220, 222, 224, 226. The four different partial behavior options 220, 222, 224, 226 have been ascertained for four different scene aspects 212, 214, 216, 218 with respect to which the roadway 203 has been assessed.

In the embodiment shown, the four different scene aspects 212, 214, 216, 218 of the roadway 203 are not exclusively ascertained with respect to structural properties of the roadway 203. All four scene aspects 212, 214, 216, 218 describe the same roadway area. The four different scene aspects 212, 214, 216, 218, on the other hand, differ with respect to driving functions and describe four different driving maneuvers of the vehicle 201. Thus, the scene aspect 212 of graph a) describes the following of the driven lane 207 by the vehicle 201. Graph b) and the scene aspect 216 described therein describe a following of the lane 207 by the vehicle 201, wherein a possible change to the further lane 205 is made possible, provided that the oncoming traffic driving in the lane 205 allows a corresponding change to the lane 205. The scene aspect 214 of graph c), on the other hand, describes the driving maneuver of stopping the vehicle 201 in front of the object 215 at least partially blocking the lane 207 driven by the vehicle 201. Graph d) describes the scene aspect 218 that defines an evasive maneuver of the vehicle 201 in which the vehicle 201 drives around the object 215 by diverting to the lane 205.

The geometric or structural properties of the roadway 203 are identically adopted in the four scene aspects 212, 214, 216, 218 shown.

In order to ascertain the mentioned geometric partial behavior options 220, 222, 224, 226, the vehicle 201 conducts a present traffic scenario based on environmental sensor data, by means of which the environment of the vehicle 201 can be mapped, and based on a planned route 202, which, in the embodiment shown, defines a driving of the vehicle along the lane 207. The traffic scenario in the embodiment shown describes the straight lined course of the roadway 203, including the two parallel lanes 205, 207, wherein the lane 207 is used for oncoming traffic. Furthermore, in the traffic scenario, the object 215 arranged in the lane 207 is ascertained. In addition, the traffic scenario comprises the route 202 which defines a driving of the vehicle along the lane 207.

The environmental sensor data can, for example, comprise camera data, LiDAR data, radar data, or other environmental sensor data from the related art for performing environment detection system.

Furthermore, in addition to the environmental sensor data, map data of a map representation, such as a digital road traffic map, can be used to define the course of the roadway 203 therethrough.

According to the present invention, after ascertaining the traffic scenario and after defining the various scene aspects 212, 214, 216, 218 or after assessing the roadway 203 with respect to the scene aspects, in order to determine the various geometric partial behavior options 220, 222, 224, 226, drivable partial surfaces 225, non-drivable partial surfaces 227 and/or partial surfaces 229 to be driven are defined for each scene aspect 212, 214, 216, 218 and each geometric partial behavior option 220, 222, 224, 226. The drivable partial surfaces 225, non-drivable partial surfaces 227 and/or partial surfaces 229 to be driven are in this case defined or ascertained, taking into account the roadway course of the roadway 203 and taking into account the respective scene aspect 212, 214, 216, 218.

In graph a), the entire lane 207 is determined as the drivable partial surface 225 for the scene aspect 220 defining a driving in the lane 207. The entire lane 205 is marked as a non-drivable partial surface 227. In this case, it still needs to be taken into account that, for the simple driving function of following the driven lane 207, which is taken into account in the mentioned scene aspect 220, it is not taken into account that the object 215 at least partially blocks the lane 207. The vehicle 201 diverting to the lane 205 is thus not taken into account, and the lane 205 is defined as a non-drivable partial surface 227 since the vehicle 201 diverting to the lane 205 contradicts the predefined driving function of the scene aspect 220, namely, the following of the lane 207.

However, in graph b) and the scene aspect 224 described therein, which describes the driving in the lane 207 but does not exclude diverting the vehicle 201 to the lane 205, both lanes 205, 207 are defined as drivable partial surfaces 225. In the traffic scenario shown, which provides for a driving in the lane 205 by the oncoming traffic, there is however no oncoming traffic in the lane 205 at the time point shown, so that the driving in the lane 205 can be carried out by the vehicle 201 without collision. The geometric partial behavior option 224 furthermore defines a partial surface 229 to be driven. The partial surface 229 to be driven can take into account the object 215 positioned in the lane 207, and the partial surface 229 to be driven makes an evasive maneuver of the vehicle 201 possible.

In graph c), the scene aspect 214 defined therein describes the driving function that excludes positioning the vehicle 201 next to the object 215. The mentioned driving function does not necessarily distinguish between the two lanes 205, 207. The areas in front of the object 215 or behind the object 215 in the driving direction D are thus defined as drivable partial surfaces 225 in both lanes 205, 207. The surfaces directly in front of or next to the object 215, on the other hand, are defined as non-drivable partial surfaces 227 since driving on this area would be contrary to the predefined driving function.

In graph d), on the other hand, the driving function that the vehicle 201 performs an evasive maneuver and drives around the object 215 is defined in the scene aspect 218. In this case, the lane 205 is taken into account as a possible evasive option. The areas in front of and behind the object 215 in the driving direction D are thus defined as drivable partial surfaces 225. The same applies to the lane 205 in the area directly next to the object 215. The lane 205 can be driven continuously since, as already mentioned above, oncoming traffic is not to be assumed in the described traffic situation. In the driving function or the geometric partial behavior option 226 shown, a partial surface 229 to be driven is furthermore defined. The partial surface 229 to be driven describes the area behind the object 215 in the driving direction D and comprises the lanes 205, 207. Thus, the partial surface 229 to be driven describes the area of the roadway 203 that is to be approached in order to perform the evasive maneuver or to drive around the object 215. When the vehicle 201 is positioned behind the object 215 in the driving direction D, the driving maneuver of driving around the object 215 is completed.

According to the present invention, after creating the plurality of different geometric partial behavior options 220, 222, 224, 226, a combination of the geometric partial behavior options 220, 222, 224, 226 is carried out and a corresponding geometric behavior option 210 is defined as a combination of the geometric partial behavior options 220, 222, 224, 226.

For this purpose, a combination process 217 of the previously generated, geometric partial behavior options 220, 222, 224, 226 is carried out. The combination process 217 combines the drivable partial surfaces 225, the non-drivable partial surfaces 227, and the partial surfaces 229 to be driven, in the individual geometric partial behavior options 220, 222, 224, 226. In this case, non-drivable partial surfaces 227 are preferably taken into account so that the non-drivable partial surfaces 227 of the combined geometric partial behavior options 220, 222, 224, 226 are taken into account in the combination, i.e., the geometric behavior option 210 generated by the combination. The combination process 217 does not need to take into account all of the geometric partial behavior options 220, 222, 224, 226 previously generated.

Graph e) describes a geometric behavior option 210 generated from a combination of the partial behavior option 220 shown in graph a) and the partial behavior option 226 described in graph d). The geometric behavior option 210 generated by the combination of the two partial behavior options 220, 226 comprises, in graph e), a non-drivable surface 211, which corresponds to the non-drivable partial surface 227 of the partial behavior option 220, which comprises the entire lane 205, and the non-drivable partial surface 227 of the partial behavior option 226, which comprises the immediate area around the object 215. Furthermore, the geometric behavior option 210 comprises a surface 213 to be driven, which corresponds to the partial surface 229 to be driven of the partial behavior option 226. In this case, the drivable surfaces 209 of the geometric behavior option 210, which are restricted exclusively to the areas in front of and behind the object 215 of the lane 207, result from the combination of the drivable partial surfaces 225 of the partial behavior option 220 and of the drivable partial surfaces 225 of the behavior option 226. It is shown that the non-drivable partial surfaces 227 of the two combined geometric partial behavior options 220, 226 are adopted in a prioritized manner. Thus, the non-drivable partial surface 227 of the partial behavior option 220 dominates the lane 205 of the geometric partial behavior option 226 defined as the drivable partial surface 225.

Graph f) shows a further geometric behavior option 210 generated by a combination of the partial behavior option 224 of graph b) and the geometric partial behavior option 222 of graph c). The non-drivable partial surface 227 of the geometric partial behavior option 222 and the non-drivable partial surface 227 of the geometric partial behavior option 222 are adopted unchanged in the combination, dominate the drivable partial surfaces 225 of the geometric partial behavior option 224 and form the non-drivable surface 211 of the geometric behavior option 210.

Graph g) shows a further geometric behavior option 210 generated by combining the partial behavior options 220 and 222. In this case, the non-drivable partial surfaces 227 of the two geometric partial behavior options 220, 222 are added and form the non-drivable surface 211 of the geometric behavior option 210.

Graph h) shows a further geometric behavior option 210 generated by combining the two geometric partial behavior options 224, 226. The non-drivable partial surface 227 of the geometric partial behavior option 226 is in turn adopted in a prioritized manner and forms the non-drivable surface 211 of the geometric behavior option 210. In this case, the partial surfaces 229 to be driven of the two geometric partial behavior options 224, 226 are added to form the surface 213 to be driven of the geometric behavior option 210.

As shown, the combinations shown result in four different possible geometric behavior options 210. According to the present invention, in the case of a plurality of calculated geometric behavior options 210, a geometric behavior option 210 is selected based on which the behavior of the vehicle 201 to be performed can be planned. In this case, geometric behavior options 210 in which the vehicle 201 is unable to drive exclusively on drivable surfaces 209 are excluded. This is the case in graph e) since the surface 213 to be driven cannot be reached by the vehicle without having to leave the drivable area. According to the present invention, the vehicle 201 driving on non-drivable surfaces 211 is excluded. As can be seen in graphs e), f), g), in the geometric behavior options 210 shown in said graphs, the vehicle 201 cannot drive around the object 215 positioned in the driving direction D. In the behavior options 210 shown in graphs e) to g), a non-drivable surface 211 is defined at least directly next to the object 215. The vehicle 201 is thus not able to drive around the object 215 by exclusively driving on the areas of the roadway 203 defined as drivable surfaces 209. If only the geometric behavior options 210 shown in graphs e) to g) were available, stopping the vehicle 201 in front of the object 215 would have to take place according to the present invention, without driving on a non-drivable surface 211.

In graph h), on the other hand, the geometric behavior option 210 shown shows a possibility of the vehicle 201 driving around the object 215, in which the vehicle 201 drives exclusively on drivable surfaces 209, without having to drive on non-drivable surfaces 211. In this case, the vehicle can be maneuvered around the object 215 on the surfaces 213 to be driven, respectively defined by the two combined geometric partial behavior options 224, 226, without having to drive on surfaces 211 not to be driven. In the example shown, the geometric behavior options shown in graphs f) to h) are permitted. According to a prioritization, the geometric behavior option 210 shown in graph h) would be selected since it enables a permitted behavior that makes following the predefined route 202, which defines a driving on the roadway 203 in the driving direction D, possible.

In order to select a suitable geometric behavior option 210, a path 230 that connects a plurality of poses 228 and represents the instantaneous course of the vehicle 201 is ascertained according to one embodiment. If such a path 230 that runs exclusively within drivable surfaces 209 can be ascertained for the respective geometric behavior option 210, the respective geometric behavior option 210 can be selected for a possible driving behavior of the vehicle 201. Graph h) shows such a path 230, which ascertains a plurality of poses 228, which respectively defined position and/or orientation information 201, and runs exclusively in drivable surfaces 209 and/or partial surfaces 213 to be driven. Such a path 230 can be carried out, according to one embodiment, for example, by performing an A* algorithm on the respective pose values 228. Alternatively, a driving trajectory can also be ascertained as a connection of a plurality of states of the vehicle.

The present invention is based on the idea that drivable partial surfaces 225 and/or non-drivable partial surfaces 227 and/or partial surfaces 229 to be driven are defined in the form of the geometric partial behavior options 220, 222, 224, 226 for various scene aspects 212, 214, 216, 218, which can, for example, be defined by various driving functions or driving maneuvers but can also describe spatially defined areas of the environment of the vehicle 201 or of the driven roadways. The size and shape of the respective partial surfaces are in this case defined as a function of the present traffic scenario, for example taking into account the course of the respectively driven roadway 203 as well as the prevailing traffic volume and taking into account the respective scene aspect 212, 214, 216, 218. In this case, the geometric partial behavior options 220, 222, 224, 226 calculated according to the differently defined scene aspects 212, 214, 216, 218 do not need to result in a behavior that can be performed by the vehicle 201. Rather, corresponding geometric partial behavior options are first calculated for the differently defined scene aspects without any evaluation. These geometric partial behavior options exclusively take into account the respective scene aspect and do not take into account other possible scene aspects. For example, a partial behavior option for a particular driving maneuver is ascertained. Other potential driving maneuvers are not taken into account. However, the latter can be taken into account in other scene aspects, for which partial behavior options can in turn be ascertained correspondingly. By combining the different partial behavior options, a feasibility of a behavior by the vehicle 201 is checked. A behavior that can be performed is ascertained if the vehicle 201 can drive exclusively on drivable surfaces 209 and can thereby reach all surfaces 213 to be driven. If this cannot be accomplished, as is, for example, the case in the behavior options shown in graphs e) to g), the vehicle 201 must be stopped.

Depending on the traffic scenario, the possible scene aspects can be defined according to the respective possible driving maneuvers. In this case, the driving maneuvers of the various scene aspects 212, 214, 216, 218 do not have to be selected from the perspective of a possible feasibility of the respective driving maneuver. Rather, for a multitude of driving maneuvers that can be performed at least theoretically, i.e., without taking into account the present traffic scenario, corresponding geometric partial behavior options can be calculated. The feasibility of a possible behavior is in this case carried out only after the combination of the various geometric partial behavior options 220, 222, 224, 226 to form the various possible geometric behavior options 210, as has been described with regard to graphs e) to h).

This makes it possible that any partial behavior options for possible driving maneuvers can first be calculated without any evaluation. An actual evaluation of feasibility is only performed subsequently in later steps. This makes possible an assessment as simple as possible of the various partial behavior options by a geometric evaluation of the corresponding defined partial surfaces, as shown in the example for graph h). By calculating corresponding possible paths 230, it is thus possible, taking into account the geometric properties of the partial surfaces 225, 227, 229 previously defined for the various geometric partial behavior options 220, 222, 224, 226, to ascertain, in a simple manner, a safe behavior that enables following the predefined route, taking into account the prevailing traffic scenario.

According to one embodiment, the geometric partial behavior options 220, 222, 224, 226 or the geometric behavior options 210 are designed as hypersurfaces. In this case, the corresponding behavior options comprise the geometric properties of the previously defined partial surfaces 225, 227, 229. In addition, the hypersurfaces can furthermore comprise information relating to control instructions to the vehicle 201, which are not shown in FIG. 1. These control instructions can, for example, comprise acceleration behavior, braking behavior, setting of light signals, such as turn signals, or other control instructions that provide for driving on the drivable surfaces 209 or surfaces 213 to be driven.

Figure 2:
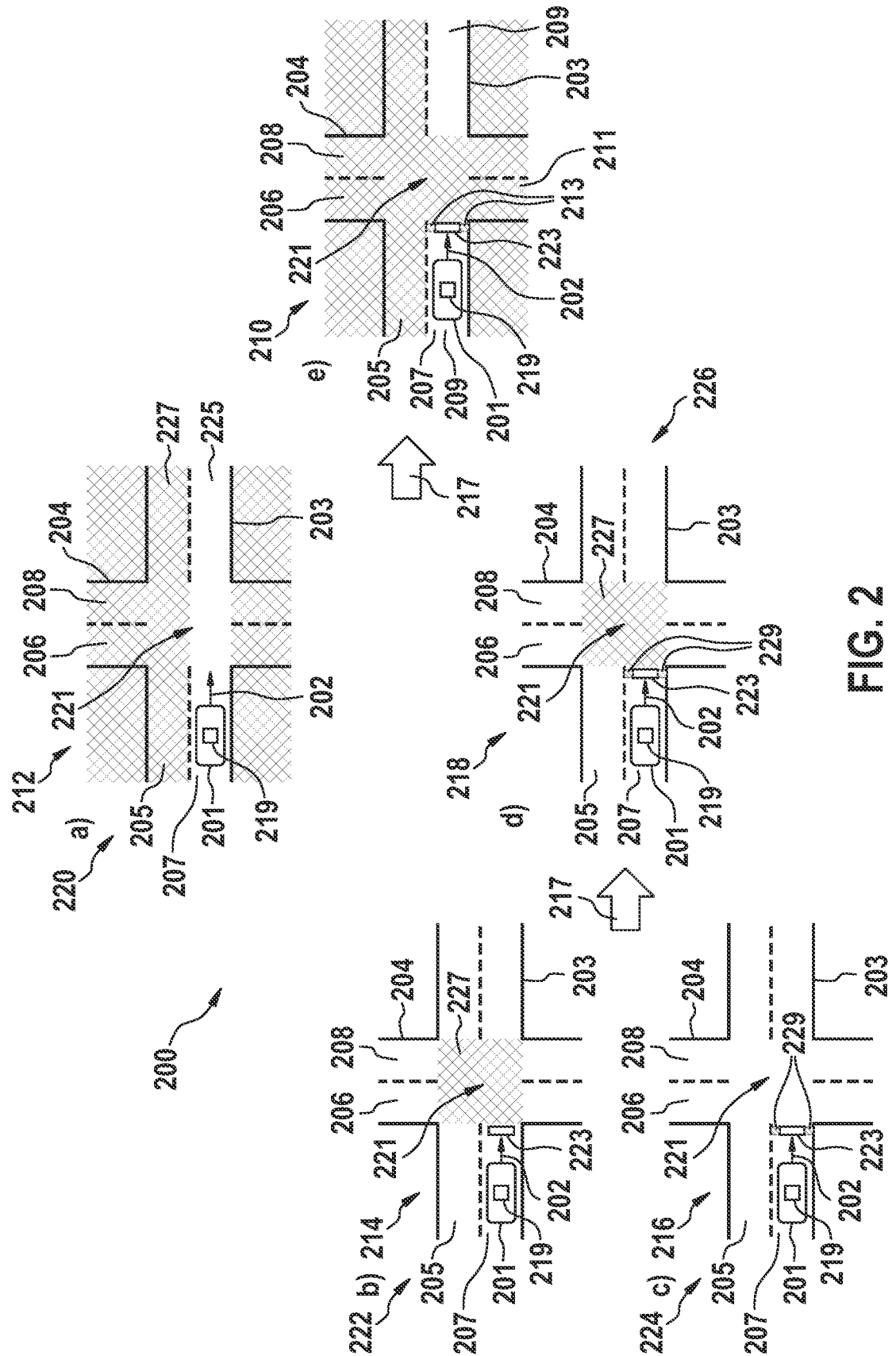
FIG. 2 shows a schematic representation of a system for behavior planning for a vehicle, according to a further example embodiment of the present invention.

FIG. 2 shows a schematic representation of a system 200 for behavior planning for a vehicle 201, according to a further embodiment.

FIG. 2 describes a traffic situation of a trip of the vehicle 201 along an intersection. In the intersection, the roadway 203 driven by the vehicle 201 intersects the lanes 205, 207 and a further roadway 204 with the lanes 206, 208. The intersection of the two roadways 203, 204 defines an intersection area 221. The predefined route 202 provides for driving on the roadway 203 and crossing the intersection.

In graphs a), b), c), the roadway 203, including the intersection, is assessed with respect to various scene aspects 212, 214, 216. The three scene aspects are in turn defined, analogously to the embodiment in FIG. 1, according to various driving functions or driving maneuvers of the vehicle 201. In this case, the scene aspect 212 of graph a) describes following the roadway 203 and driving in the lane 207. Driving in the lane 207 is not taken into account by the present intersection and the defined intersection area 221. The scene aspect 214 of graph b), on the other hand, describes a driving maneuver of stopping the vehicle 201 at a stop line 223. On the other hand, the scene aspect 216 of graph c) describes a driving maneuver of maximizing a viewing range of the vehicle 201 into the intersection area 221 by the vehicle 210 while stopping at the stop line 223.

According to the embodiment of graph a) in FIG. 1, a corresponding geometric partial behavior option 220 is defined for the scene aspect 212. For this purpose, a drivable partial surface 225 is defined in the form of the lane 207 driven by the vehicle 201. Since the intersection area 221 is not taken into account in the mentioned driving function, the drivable partial surface 225 runs beyond the intersection area 221. The further lane 205 or the further roadway 204, on the other hand, are defined as a non-drivable partial surface 227. Although driving on the further lane 205 or further roadway 207 without collision may be possible according to the prevailing traffic rules or according to the prevailing traffic volume, it would contradict the considered driving maneuver, which exclusively provides for following the already driven lane 207. Likewise, areas outside of the two roadways 203, 204 are defined as non-drivable partial surfaces 227 since they are not provided for use by vehicle 201 according to the prevailing traffic rules.

Since graph b) or the scene aspect 214 defined therein describes the driving function of stopping the vehicle 201 in front of the stop line 223 depicted in the lane 207, the intersection area 221 in the corresponding geometric partial behavior option 222 is defined as a non-drivable partial surface 227. The stop line 223 can, for example, be a stop line of a stop sign or of another traffic sign that provides for at least a brief stop of the vehicle 201 in front of the defined stop line 223. Driving on the intersection area 221 would thus be invalid according to the defined driving function so that the intersection area 221 is defined as the non-drivable partial surface 227.

Graph c) describes a scene aspect 216 which defines a driving function that provides for optimization of a viewing range into the intersection area 221 by the vehicle 201. For this purpose, the corresponding geometric partial behavior option 224 defines two partial surfaces 229 to be driven, which are respectively arranged at the two ends of the stop line 223 depicted in the lane 207. When positioning the vehicle 201 on the correspondingly defined partial surfaces 229 to be driven, a viewing range into the intersection area 221 by the vehicle 201 can thus be optimized. Since the corresponding scene aspect 216 or the considered driving function exclusively takes into account the optimization of the viewing range into the intersection area 221, all further areas of the roadway 203 or of the further roadway 204 are not taken into account since they are not important with respect to the driving function to be fulfilled of optimizing the viewing range.

Graph d) shows a combination of the geometric partial behavior options 222, 224 of graphs b) and c). Since the geometric partial behavior option 222 of graph b) exclusively defines the non-drivable partial surface 227 of the intersection area 221, and the geometric partial behavior option 224 takes into account the partial surfaces 229 to be driven, the geometric partial behavior option 226 resulting from the combination of the two partial behavior options 222, 224 exclusively comprises the non-drivable partial surface 227 of the intersection area 221 and the two partial surfaces 229 that are to be driven and are laterally next to the stop line 223.

Graph e) furthermore shows a further combination of the geometric partial behavior options 226 of graph d) with the geometric partial behavior option 220 of graph a). The correspondingly resulting geometric behavior option 210 of graph e) comprises the drivable and non-drivable partial surfaces 225, 227 of the geometric partial behavior option 220 as well as the non-drivable partial surfaces 227 and the partial surfaces 229 to be driven of the geometric partial behavior option 226. As already mentioned, when combining the geometric partial behavior options, the respective non-drivable partial surfaces 227 are taken into account in a prioritized manner. This has the result that, in the area of the intersection area 221, the lane 207, which is defined as a drivable partial surface 225 according to the partial behavior option 220 of graph a), is defined in the geometric behavior option 210 of graph e) as the non-drivable partial surface 227 according to the non-drivable partial surface 227 of the geometric partial behavior option 226.

The non-drivable surfaces 211 of the geometric behavior option 210 thus result from a combination of the non-drivable partial surfaces 227 of the geometric partial behavior option 220 of graph a) and the non-drivable partial surface 227 of the geometric partial behavior option 226 of graph d). The drivable partial surfaces 225 of the geometric behavior option 210, on the other hand, result exclusively from the drivable partial surface 225 of the geometric partial behavior option 220, wherein, by the combination with the non-drivable partial surface 227 of the geometric partial behavior option 226 of graph d), the area of the lane 207 in the intersection area 221 is now likewise marked as a non-drivable surface 211 due to the dominant consideration of the non-drivable partial surface 227 of the geometric partial behavior option 226. The partial surfaces 229 to be driven of the geometric partial behavior option 226 of graph d), on the other hand, are adopted unchanged and form the surfaces 213 to be driven of the geometric behavior option 210.

This results in that the correspondingly generated geometric behavior option 210 in the embodiment shown enables a driving behavior of the vehicle 201 that would allow the latter to pass through the intersection area 221 in the lane 207 driven. Since the entire intersection area 221 is defined as a non-drivable partial surface 227 in the corresponding geometric partial behavior option 222 according to the driving function, taken into account in the scene aspect 214, of stopping the vehicle 201 in front of the stop line 223, the intersection area 221 in the geometric behavior option 210 is likewise marked as a non-drivable surface 211. The lane 207, otherwise marked as a drivable surface 209, is thus defined as a non-drivable surface 211 in the area of the intersection area 221. The lane 207 thus describes two separate drivable surfaces 209. Driving in the lane 207 exclusively on drivable surfaces 209 is thus not possible for the vehicle 201. According to the present invention, the vehicle 201 must therefore be stopped in front of the stop line 223. Driving on the intersection or the intersection area 221, which is marked as a non-drivable surface 211, is however not allowed.

The examples described above are merely illustrative in nature. In deviation from the shown scene aspects or the considered driving maneuvers or driving functions, other driving maneuvers or driving functions or other geometric or geographic properties of the driven roadways may be taken into account. In addition, a multitude of additional driving maneuvers can be taken into account and corresponding geometric partial behavior options can be calculated. In addition, any other combination of the corresponding geometric partial behavior options for ascertaining a corresponding geometric behavior option 210 is possible. The examples shown are not intended to restrict the present invention.

FIG. 3 shows a flow chart of a method 100 for behavior planning for a vehicle 201, according to one embodiment.

In the first method step 101, data of an environment detection system and of a planned route 202 of the vehicle 201 are first received. The environment detection system has, for example, been performed based on environmental sensor data of a plurality of environmental sensors of the vehicle 201 and is configured to represent a detailed description of the environment, in particular a course of the roadway 203 driven.

In a further method step 103, a traffic scenario is ascertained based on the data of the environment detection system and of the planned route 202, wherein the traffic scenario describes at least one course of a roadway 203 driven by the vehicle 201, and the corresponding planned route 202.

In a further method step 105, at least one geometric behavior option 210 is ascertained based on the traffic scenario, wherein the geometric behavior option 210 defines at least one surface 209 that can be driven by the vehicle 201, and/or one surface 211 that cannot be driven by the vehicle 201, and/or one surface 213 to be driven by the vehicle 201.

In a method step 109, for this purpose, the roadway 203 driven by the vehicle 201, and/or an environment of the roadway 203 are assessed with respect to a plurality of scene aspects 212, 214, 216, 218. Assessing with respect to the scene aspects can take place according to a geometric or geographic nature of the roadway 203. Alternatively, or additionally, the scene aspects can take into account various driving functions or driving maneuvers of the vehicle 201.

In a further method step 111, at least one geometric partial behavior option 220, 222, 224, 226 is ascertained for each scene aspect 212, 214, 216, 218, wherein the geometric partial behavior options 220, 222, 224, 226 respectively define at least one drivable partial surface 225 and/or one non-drivable partial surface 227 and/or one partial surface 229 to be driven.

In a further method step 113, the partial behavior options 220, 222, 224, 226 are combined and a corresponding geometric behavior option 210 is generated from the combination of the geometric partial behavior options 220, 222, 224, 226.

In a further method step 107, a behavior that can be performed by the vehicle 201 is ascertained taking into account the at least one behavior option.

In the event that a plurality of different geometric behavior options 210 has been generated by the combinations of the various geometric partial behavior options 220, 222, 224, 226, a behavior option 210 is selected according to a selection criterion from the plurality of geometric behavior options 210 in a method step 115. The selection criterion can comprise, for example, that a geometric behavior option 210 that makes it possible for the vehicle 201 to drive exclusively on drivable surfaces 209 is present. Furthermore, the selection criterion can comprise a time period needed to drive on the roadway 203 according to the geometric behavior option 210. Alternatively, or additionally, the geometric behavior option 210 can be selected such that a driving behavior correspondingly based thereon corresponds to a preferred driving behavior of the vehicle 201 or matches a behavior of the vehicle 201 performed up to the time of performing the behavior planning. A selection criterion can furthermore comprise a number or an intensity of acceleration processes or steering processes or a matching with a preferred driving behavior, for example passive, safe or sporty driving behavior.

In a further method step 117, however, a trip of the vehicle 201 is stopped if a trip of the vehicle 201 along exclusively drivable surfaces 209 of the geometric behavior option 210 is not possible.

FIG. 4 shows a flow chart of a method 300 for controlling a vehicle 201, according to one embodiment.

In a first method step 301, the method 100 according to the present invention for behavior planning for a vehicle 201 is first performed according to one of the embodiments described above, and a behavior to be performed by the vehicle 201 is planned.

In a further method step 303, at least one control function of the vehicle 201 is subsequently performed according to the planned behavior and the vehicle 201 is controlled accordingly. The control function can comprise one from the related art for controlling vehicles 201, in particular autonomously driving vehicles, and can be suitable to control the vehicle according to the planned behavior.

FIG. 5 shows a schematic representation of a computer program product 400 comprising instructions that, when the program is executed by a data processing unit, cause the latter to perform the method 100 for behavior planning of a vehicle and/or the method 200 for controlling a vehicle.

The computer program product 400 is stored on a storage medium 401 in the embodiment shown. The storage medium 401 can be any storage medium from the related art.

What is claimed is:

1. A method for controlling a vehicle, the method comprising the following steps during a drive of the vehicle:

performing, by a processor system that includes at least one processor of the vehicle, a behavior planning of the vehicle, the behavior planning including:

receiving (a) data of an environment detection sensor system of the vehicle and (b) data of a planned route of the vehicle;

ascertaining a traffic scenario based on the data of the environment detection sensor system and of the planned route, wherein:

the ascertaining of the traffic scenario includes generating, for a present surroundings state of the vehicle, a plurality of distinct scene perspectives; and each scene perspective classifies a respective one or more of a plurality of road sections of the environment, the plurality of road sections thereby being classified by the plurality of distinct scene perspectives into at least one drivable surface that can be driven by the vehicle according to prevailing traffic rules and/or without collision in the given traffic scenario, at least one non-drivable surface that cannot be driven by the vehicle according to the prevailing traffic rules and/or without collision in the given traffic scenario, and at least one surface that is determined, based on the planned route, to be required to be driven by the vehicle;

analyzing the plurality of scene perspectives concurrently to determine which respective combinations of two or more thereof contain inconsistencies in their respective classifications; and selecting, based on the analyzing, one or more of the generated scene perspectives, thereby forming a planned driving behavior according to a condition that all road sections of the planned driving behavior are classified by the selected one or more scene perspectives as being drivable and performing, by the processor system and based on the formation of the planned driving behavior, at least one control function that controls the vehicle to perform an automated drive operation navigating the vehicle along the road sections of the planned driving behavior.

2. The method according to claim 1, wherein, if, for one of the combinations, a road section is determined by the analyzing to have been inconsistently classified as non-drivable in one of the scene perspectives of the combination and drivable in another of the scene perspectives of the combination, the selecting is performed such that the inconsistently classified road section is treated as non-drivable in the planned driving behavior.

3. The method according to claim 1, wherein a size and/or a position of each drivable surface, drivable surface, and/or required-to-be-driven surface is determined as a function of properties of the driven roadway and/or taking into account a prevailing traffic regulation and/or taking into account a traffic volume.

4. The method according to claim 1, wherein the plurality of distinct scene perspectives are generated based on different roadway portions of the traffic scenario, the roadway portions-including at least one of the following: straight section, curved section, intersection area, intersection entrance, intersection exit, traffic-lighted intersection, non-traffic-lighted intersection, right turn, left turn, highway entrance ramp, highway exit, highway, country road, one-lane road, multi-lane road with or without oncoming traffic, inner-city road, traffic-calmed zone, 30 km/h area, tunnel entrance, tunnel exit, tunnel area, road with an upward slope, road with a downward slope, entrance into roundabout, roundabout, exit from roundabout, railroad crossing, parking lot entrance, parking lot exit, parking lot, parking garage entrance, parking garage exit, and parking garage.

5. The method according to claim 1, wherein the plurality of distinct scene perspectives are generated based on different driving maneuvers of the vehicle, wherein the driving maneuvers of the vehicle comprise at least one of: driving along a straight section, cornering, turning process, lane change, driving on a highway, driving on a country road, inner-city driving, accelerated driving, stopping at a stop line, driving onto a highway, exiting a highway, entering a tunnel, exiting a tunnel, entering an intersection, crossing an intersection, exiting an intersection, entering a roundabout, driving in a roundabout, exiting a roundabout, stopping at a railroad crossing, crossing a railroad crossing, driving around an obstacle, driving in a construction area, entering a parking garage, exiting a parking garage, and driving in a parking garage.

6. The method according to claim 1, wherein the scene perspectives are configured as hypersurfaces and include control instructions in addition to the drivable surfaces, the non-drivable surfaces, and/or the required-to-be-driven surfaces, and wherein the control instructions include: maintaining a maximum allowable speed, and/or maintaining a maximum allowable time period for driving on a predefined partial area of the roadway, and/or performing a predefined steering angle, and/or performing a predefined braking power, and/or activating a light signal, and/or positioning the vehicle in a position with maximum view of a portion of the roadway positioned in front of the vehicle.

7. The method according to claim 6, wherein the selecting of the one or more scene perspectives is performed according to a selection criterion.

8. The method according to claim 7, wherein the forming of the planned driving behavior includes:
   stopping a trip of the vehicle when the trip of the vehicle along exclusively drivable surfaces is not possible.

9. The method according to claim 8, wherein the selection criterion includes: availability of a trip of the vehicle along exclusively drivable surfaces, and/or a time period needed to drive on the roadway according to the planned driving behavior, and/or a safety of the vehicle expected while driving on the roadway according to the planned driving behavior, and/or a number of steering movements and/or an intensity of steering movements and/or acceleration processes needed to drive on the roadway according to the planned driving behavior, and/or a matching of a driving behavior of the vehicle corresponding to the planned driving behavior with a driving behavior of the vehicle currently being performed.

10. The method according to claim 7, wherein the selecting includes ascertaining a path or a driving trajectory that follows the control instructions within the drivable surfaces of the planned driving behavior.

11. The method according to claim 10, wherein the ascertaining of the path includes performing an algorithm on a plurality of possible poses of the vehicle and/or states of the vehicle within the drivable surfaces of the planned driving behavior.

12. A system for controlling a vehicle, the system comprising:
   a sensor system of the vehicle; and
   a processor system that includes at least one processor of the vehicle, wherein the processor system is configured to:

perform a behavior planning of the vehicle, the behavior planning including:
   receiving (a) data of the sensor system corresponding to a detection of an environment of the vehicle and (b) data of a planned route of the vehicle;
   ascertaining a traffic scenario based on the data of the sensor system and of the planned route, wherein;
      the ascertaining of the traffic scenario includes generating, for a present surroundings state of the vehicle, a plurality of distinct scene perspectives; and
      each scene perspective classifies a respective one or more of a plurality of road sections of the environment, the plurality of road sections thereby being classified by the plurality of distinct scene perspectives into at least one drivable surface that can be driven by the vehicle according to prevailing traffic rules and/or without collision in the given traffic scenario, at least one non-drivable surface that cannot be driven by the vehicle according to the prevailing traffic rules and/or without collision in the given traffic scenario, and at least one surface that is determined, based on the planned route, to be required to be driven by the vehicle;
   analyzing the plurality of scene perspectives concurrently to determine which respective combinations of two or more thereof contain inconsistencies in their respective classifications; and
   selecting, based on the analyzing, one or more of the generated scene perspectives, thereby forming a planned driving behavior according to a condition that all road sections of the planned driving behavior are classified by the selected one or more scene perspectives as being drivable; and
perform, based on the formation of the planned driving behavior, at least one control function that controls of the vehicle to perform an automated drive operation navigating the vehicle along the road sections of the planned driving behavior.

13. A non-transitory computer-readable medium on which is stored a computer program that is executable by a data processor of a vehicle and that, when executed by the data processor, causes the data processor to perform a method for controlling the vehicle, the method comprising the following steps during a drive of the vehicle:
   performing a behavior planning of the vehicle, the behavior planning including:
      receiving (a) data of an environment detection sensor system of the vehicle and (b) data of a planned route of the vehicle;
      ascertaining a traffic scenario based on the data of the environment detection sensor system and of the planned route, wherein:
         the ascertaining of the traffic scenario includes generating, for a present surroundings state of the vehicle, a plurality of distinct scene perspectives; and
         each scene perspective classifies a respective one or more of a plurality of road sections of the environment, the plurality of road sections thereby being classified by the plurality of distinct scene perspectives into at least one drivable surface that can be driven by the vehicle according to prevailing traffic rules and/or without collision in the given traffic scenario, at least one non-drivable surface that cannot be driven by the vehicle according to the prevailing traffic rules and/or without collision in the given traffic scenario, and at least one surface that is determined, based on the planned route, to be required to be driven by the vehicle;

analyzing the plurality of scene perspectives concurrently to determine which respective combinations of two or more thereof contain inconsistencies in their respective classifications; and selecting, based on the analyzing, one or more of the generated scene perspectives, thereby forming a planned driving behavior according to a condition that all road sections of the planned driving behavior are classified by the selected one or more scene perspectives as being drivable; and performing, based on the formation of the planned driving behavior, at least one control function that controls the vehicle to perform an automated drive operation navigating the vehicle along the road sections of the planned driving behavior.

\* \* \* \* \*